United States Patent [19]

Akutsu et al.

[11] Patent Number: 4,859,894
[45] Date of Patent: Aug. 22, 1989

[54] ALTERNATING CURRENT GENERATOR FOR USE IN A VEHICLE

[75] Inventors: Shigeru Akutsu, Gumma; Kiyoshi Tsuchiya, Kiryu, both of Japan

[73] Assignee: Mitsuba Electric Mfg. Co., Ltd., Japan

[21] Appl. No.: 90,691

[22] Filed: Aug. 28, 1987

[30] Foreign Application Priority Data

Sep. 1, 1986 [JP] Japan .............. 61-132720[U]
Sep. 1, 1986 [JP] Japan .................. 61-203794

[51] Int. Cl.⁴ .............................. H02K 13/00
[52] U.S. Cl. ................. 310/239; 310/68 R; 310/71; 310/89
[58] Field of Search ........... 310/68 D, 71, 88, 263, 310/232, 239, 242, 245, 147, 240, 42, 89, 261, 241, 248, 68 R

[56] References Cited

U.S. PATENT DOCUMENTS

| | | | |
|---|---|---|---|
| 3,184,625 | 5/1965 | Farison | 310/59 |
| 3,187,214 | 6/1965 | Brezosky | 310/247 |
| 3,226,581 | 12/1965 | Brewster | 310/59 |
| 3,271,606 | 9/1966 | Collins | 310/263 |
| 3,305,740 | 2/1967 | Shano | 310/42 |
| 3,361,915 | 1/1968 | Baker | 310/68 |
| 3,422,339 | 1/1969 | Baker | 321/8 |
| 3,441,766 | 4/1969 | Amrein | 310/239 |
| 3,538,362 | 11/1970 | Cheetham | 310/68 |
| 3,714,484 | 1/1973 | Habert | 310/263 |
| 3,731,126 | 5/1973 | Hagenlocher | 310/239 |
| 3,831,045 | 8/1974 | Anisimov | 310/52 |
| 4,028,568 | 6/1977 | Tatsumi | 310/42 |
| 4,087,713 | 5/1978 | Binder | 310/266 |
| 4,100,440 | 7/1978 | Binder | 310/42 |
| 4,311,936 | 1/1982 | Ozaki | 310/245 |
| 4,406,961 | 9/1983 | Pfluger | 310/232 |
| 4,418,295 | 11/1983 | Shiga | 310/59 |
| 4,419,597 | 12/1983 | Shiga | 310/68 |
| 4,464,594 | 8/1984 | Matsumoto | 310/63 |
| 4,492,885 | 1/1985 | Kitamura | 310/62 |
| 4,499,390 | 2/1985 | Iwaki | 310/232 |
| 4,500,772 | 2/1985 | Ahner | 219/209 |
| 4,546,280 | 10/1985 | Pfluger | 310/239 |
| 4,549,103 | 10/1985 | Shiga | 310/60 |
| 4,617,485 | 10/1986 | Nakamura | 310/65 |
| 4,673,838 | 6/1987 | Takagi | 310/42 |
| 4,705,983 | 11/1987 | Franz | 310/68 D |

FOREIGN PATENT DOCUMENTS

| | | |
|---|---|---|
| 10180773 | 5/1986 | European Pat. Off. . |
| 2845663 | 5/1980 | Fed. Rep. of Germany ... 310/68 D |
| 3026460 | 2/1982 | Fed. Rep. of Germany ... 310/68 D |
| 0169350 | 9/1984 | Japan .............. 310/239 UX |
| 2001482 | 1/1979 | United Kingdom . |
| 2075761 | 11/1981 | United Kingdom . |

*Primary Examiner*—R. Skudy
*Attorney, Agent, or Firm*—Darby & Darby

[57] ABSTRACT

An alternating current generator includes a frame, a rotation shaft, a slip ring attached to the rotation shaft, a brush in contact with the slip ring, and a brush holder secured to the frame. The brush holder includes a brush-guiding portion and a cover portion. The brush-guiding portion of the brush holder has a hollow slidably receiving the brush for movement in a radial direction with respect to the rotation shaft. The cover portion of the brush holder encloses that portion of the rotation shaft whee the slip ring is attached so that the slip ring is protected from outside dust and splash. This cover portion is integrally formed with the brush-guiding portion in such a manner that neither a clearance nor a mating surface is produced between the cover portion and the brush-guiding portion.

5 Claims, 6 Drawing Sheets

ALTERNATING CURRENT GENERATOR FOR USE IN A VEHICLE

BACKGROUND OF THE INVENTION

This invention relates to an alternating current generator used in a vehicle such as an automobile, bus, truck, motorcycle and the like, the generator having a brush holder which is excellent at protecting the brush and the slip ring from corrosion or abrasion.

In a prior art, Japanese Patent Application Preliminary Publication No. sho 59-169350 discloses an alternating current generator for a vehicle. This generator has a brush holder and a separate cylindrical cover member. The brush holder contains brushes which are urged by springs against slip rings on the rotation shaft of a rotor core. The cylindrical cover member encloses the slip rings so that the slip rings are protected from dust and splash of rainwater. The brush holder and the cover member are hermetically adjoined to each other through packing member. However, dislocation of the brush holder or deterioration of the packing member can cause a clearance between the brush holder and the cylindrical cover member, which then introduces outside dust or splash of rainwater into the cover member. This phenomenon accelerates both corrosion of slip rings and abrasion of the brushes.

Some of the conventional generators have a regulator, the earth terminal of which is connected to the serration section of a fastening bolt which fastens the regulator to the frame of the generator. When a nut is turned to be engaged with the fastening bolt, a torque due to the turning of the nut is transferred to the earth terminal. Therefore, there is a tendency for a backlash to occur between the earth terminal and the fastening bolt, resulting in imperfect contact of the earth terminal with the fastening bolt.

SUMMARY OF THE INVENTION

Accordingly, it is an object of the present invention to provide an alternating current generator in which the slip rings and the brushes are well protected from corrosion and abrasion.

Another object of the present invention is to provide an alternating current generator in which the setting and the removal of the brushes to and from the brush holder can be easily achieved.

Still another object of the present invention is to provide an alternating current generator in which proper contact between the earth terminal and the fastening bolt is assured even after the repetition of the engaging and disengaging actions of the nut.

With these and other objects in view, the present invention provides an alternating current generator having a brush holder which includes a brush-guiding portion and a cover portion. The brush-guiding portion has a hollow slidably receiving a brush for movement in a radial direction with respect to a rotation shaft. The cover portion encloses that portion of the rotation shaft where a slip ring is attached so that the slip ring is protected from outside dust and splash. The cover portion and the brush-guiding portion are integrally formed with each other in such a manner that neither a clearance nor a mating surface is produced between the cover portion and the brush-guiding portion.

It is preferred that the hollow opens to the outer end face of the brush-guiding portion so that the brush can be removed from and inserted into the hollow through the opening at the outer end face of the brush-guiding portion. It is also preferred that the brush holder has a lid detachably attached to the brush-guiding portion for opening and closing the opening at the outer end face of the brush-guiding portion.

The lid may have a terminal member projecting from both the inner and outer faces of the lid. In this case, the brush is electrically connected to the terminal member, and may be connected to the inner face of the lid through a spring member to facilitate the removing and resetting of the brush from and into the brush holder. The terminal member connected to the brush may be provided on the brush-guiding portion instead of on the lid.

The brush holder may be fastened to the frame of the generator by a bolt member which also fastens the regulator to the frame. If the bolt member has a serration section electrically engaged with the terminal member of the regulator, it is preferred that the bolt member has a locking section having a noncircular cross-section. In this case, the brush holder may have a bracket arm firmly engaged with the locking section of the bolt member so that the bolt member is prevented from turning.

DETAILED DESCRIPTION OF THE PREFERRED EMBODIMENT

Figure 1:
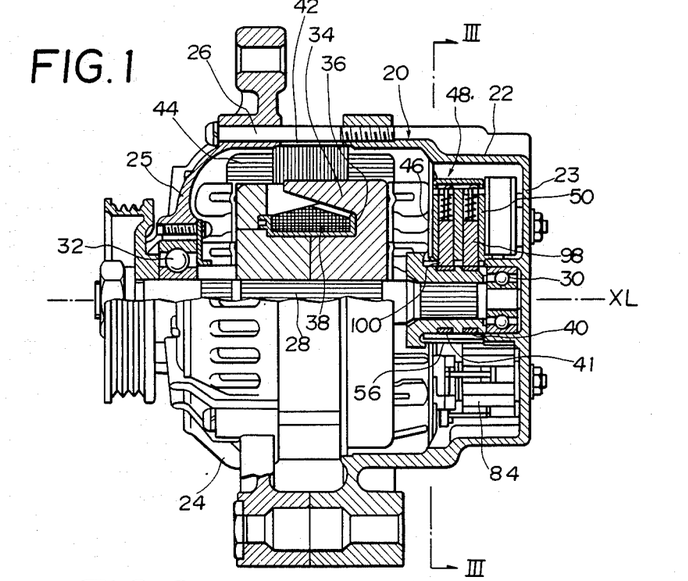
FIG. 1 is a side-elevational view, partly in section, of an alternating current generator according to the present invention.
Figure 2:
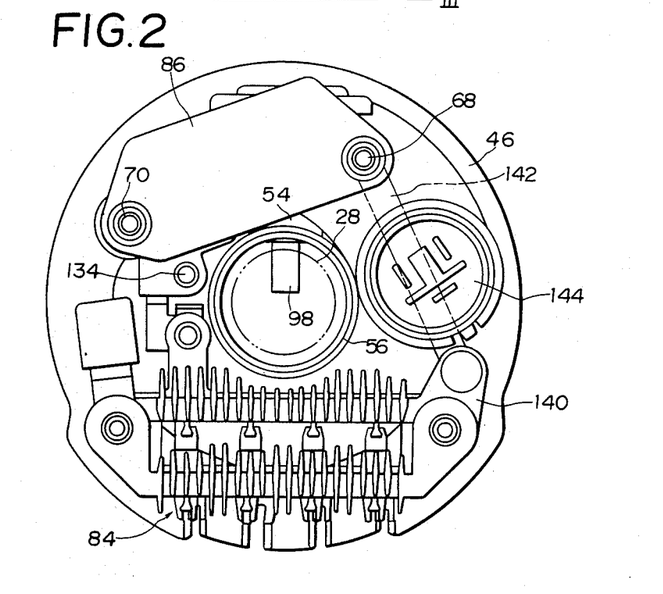
FIG. 2 is a rear view of the generator in FIG. 1 with its frame omitted.
Figure 11:
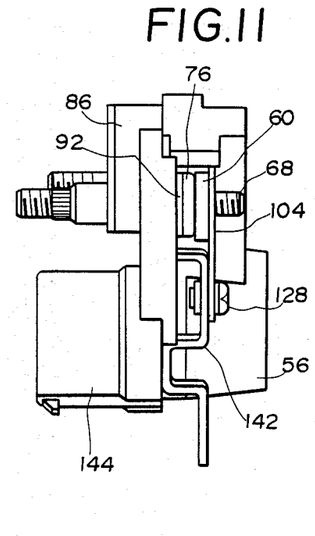
FIG. 11 is a side-elevational view of the brush holder assembled together with a regulator, fastening bolts and the like for mounting on the frame.
Figure 13:
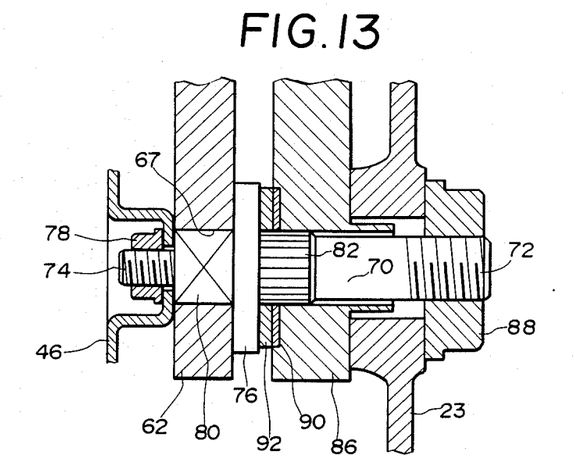
FIG. 13 is an enlarged cross-sectional view part of the generator through which a fastening bolt passes.

FIG. 1 illustrates a generator according to the present invention, which is designed to be used in an automobile. Reference numeral 20 in FIG. 1 designates a frame of the generator, which includes a pair of generally cylindrical frame bodies 22 and 24, each having an open end and a closed end. These frame bodies 22 and 24 are secured to each other by a plurality of bolts 26 at their open ends. A rotation shaft 28 extends between the end walls 23 and 25 of the frame bodies 22 and 24, and is supported at its opposite end portions respectively by the frame bodies 22 and 24 through bearings 30 and 32 so that the rotation shaft 28 is rotatable about its longitudinal axis XL. A rotor including a rotor core 34 of the lundell type fits fixedly around the rotation shaft 28. This rotor core 34 has a coil bobbin 36 coaxially disposed in it. The coil bobbin 36 supports a rotor coil 38 which winds around it. Slip rings 40 and 41 which are electrically connected to the rotor coil 38 are attached to that portion of the rotation shaft 28 between the rotor core 34 and the bearing 30. A stator 42 on which a stator coil is supported is secured to the inner face of the frame 20 in such a manner that the stator 42 surrounds the rotor core 34. A bracket plate 46 generally parallel to the end wall 23 of the frame body 22 is integrally connected to the frame body 22 between the rotor core 34 and the bearing 30. This bracket plate 46 cooperates with the frame body 22 in supporting a brush holder 48, a rectifier 84 and a regulator 86 (as shown in FIGS. 2, 11, and 13). Naturally, the bracket plate 48 has an aperture the rotation shaft 28 to pass therethrough.

Figure 3:
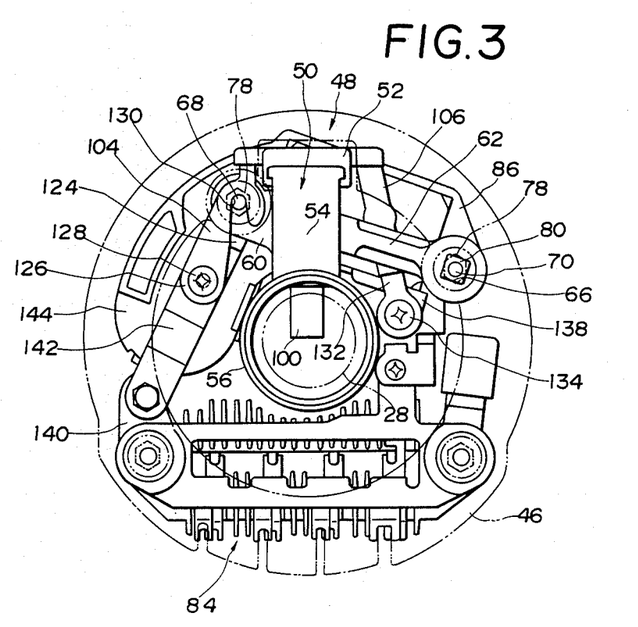
FIG. 3 is a view taken along the line III—III in FIG. 1.
Figure 7:
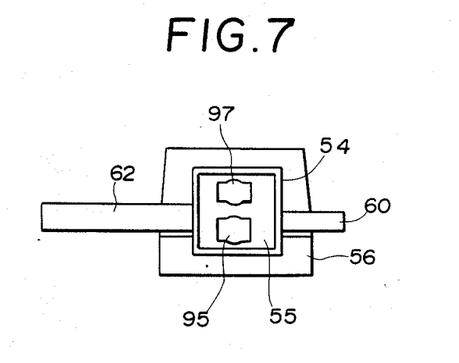
FIG. 7 is a plan view of the holder body in FIG. 5.
Figure 14:
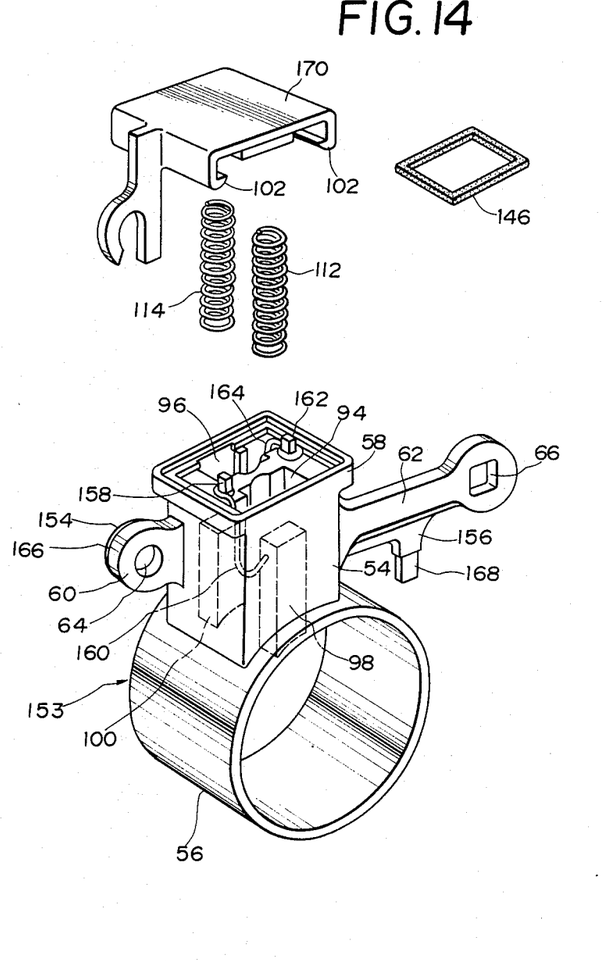
FIG. 14 is an exploded perspective view of a modified form of the brush holder shown in FIG. 4.

As shown in FIGS. 2 and 3, the brush holder 48 consists of a holder body 50 and a lid 52, and is secured, by means of fastening bolts 68 and 70, to the bracket plate 46 facing the end wall 23 of the frame body 22. The holder body 50 is of a unitary structure constituted of a brush-guiding portion 54 and a cylindrical cover portion 56 for covering the slip rings 40 and 41. That is to say, the holder body 50 has a hollow cylindrical cover portion 56 integrally formed with a brush-guiding portion 54. The cylindrical cover portion 56 encloses that portion of the rotation shaft 28 where the slip rings 40 and 41 are attached so that the slip rings 40 and 41 are prevented from being exposed to outside dust and splash such as rainwater. The guiding portion 54 extends radially outward from the cover portion 56, and is provided at its outer end portion with engaging projections 58 (as shown in FIGS. 4-6 and 14) adapted to be engaged with the lid 52. Referring to FIGS. 5 and 7 the guiding portion 54 has a pair of hollows 94 and 96 (as shown in FIG. 14) extending radially through the guiding portion 54, in which a pair of brushes 98 and 100 are slidably received for radially inward and outward movement. In this construction, since the holder body 50 is of a unitary structure, there is neither a clearance nor a mating face between the hollow cylindrical cover portion 56 and the brush-guiding portion 54. Consequently, the holder body 50 strictly protects slip rings 40 and 41 from both dirt and splash, thereby putting off both corrosion of the slip rings 40 and 41 and abrasion of the brushes 98 and 100. This results in the long life of the generator.

Figure 4:
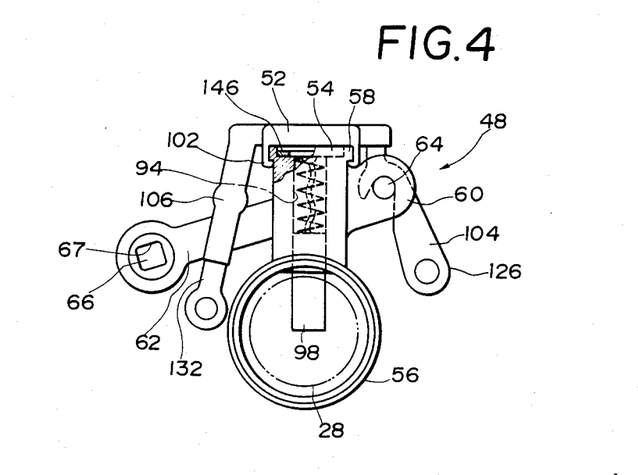
FIG. 4 is a rear view, partly in section, of a brush holder in FIG. 1.
Figure 5:
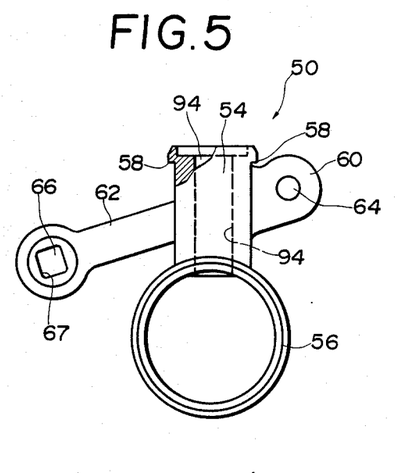
FIG. 5 is a rear view, partly in section, of a holder body of the brush holder in FIG. 4.
Figure 6:
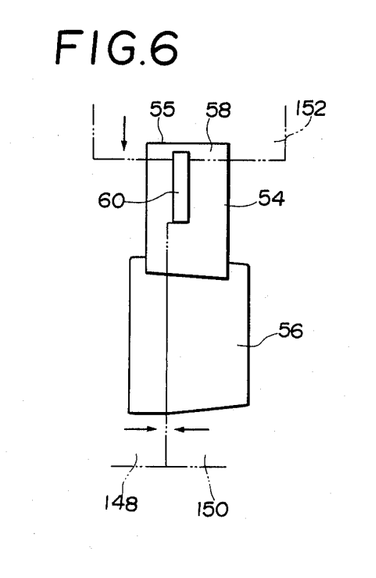
FIG. 6 is a side-elevational view of the holder body in FIG. 5.

As shown in FIG. 4, the guiding portion 54 of the holder body 50 also has first and second bracket arms 60 and 62 protruding in opposite directions therefrom. The first bracket arm 60 has a circular aperture 64 formed in its end portion while on the other hand, the second bracket arm 62 has a square aperture 66 formed in its end portion. As illustrated in FIG. 13, each of the fastening bolts 68 and 70 (see FIGS. 2, 3, 11, and 12) has a flange portion 76 between its outer and inner end portions 72 and 74. These bolts 68 and 70 are inserted respectively into the apertures 64 and 66 of the bracket arms 60 and 62, and then pass through the bracket plate 46. A nut 78 is threadedly engaged with the inner end portion 74 of each of the fastening bolts 68 and 70 projecting from the inner face of the bracket plate 46, whereby the holder body 50 (as shown in FIGS. 1, 3, and 5) is fastened to the bracket plate 46. The fastening bolt 70, in particular, has a square pole-shaped locking section 80 between the flange portion 76 and inner end portion 74. This locking section 80 is in engagement with the peripheral wall 67 of the square aperture 66 of the second bracket arm 62, whereby the fastening bolt 70 is prevented from turning. The outer end portion 72 of each of the fastening bolts 68 and 70 passes through both the regulator 86 and the end wall 23 of the frame body 22, and threadedly engages with a nut 88 outside the frame 20. That is, not only the regulator 86 but also the holder body 50 are secured to the frame body 22. Each of the fastening bolts 68 and 70 is provided between its flange portion 76 and its outer end portion 72 with a serration section 82 having a plurality of teeth disposed at an equal angular spacing. Each bolt's serration section 82 is fixedly engaged with the regulator 86. In particular, the serration section 82 of the bolt 70 is tightly fitted in the regulator 86 so that the serration section 82 is in firm contact with an earth terminal 90 on the inner face of the regulator 86. This causes the terminal 90 to be electrically connected to the bolt 70 to achieve the earthing of the regulator 86. Reference numeral 92 in FIG. 13 denotes a washer interposed between the earth terminal 90 and the flange portion 76 of the fastening bolt 70. When the nut 88 is turned to be engaged with the bolt 70, the regulator 86 is subjected to less torque than regulators of conventional generators since most of the torque due to the turning of the nut 88 is transferred to the bracket arm 62 of the brush holder 48. Therefore, the firm contact between the bolt 70 and the earth terminal 90 is still retained even after the repetition of the engaging and disengaging actions of the nut 88 and even though the thickness of the terminal 90 is as small as 0.8 mm. This fact enhances the reliability of the regulator 86. The bracket arm 62, that is, a part of the brush holder 48 is utilized in this generator as means for preventing the bolt 70 from turning, which enhances the simplicity of the structure of the generator.

Figure 8:
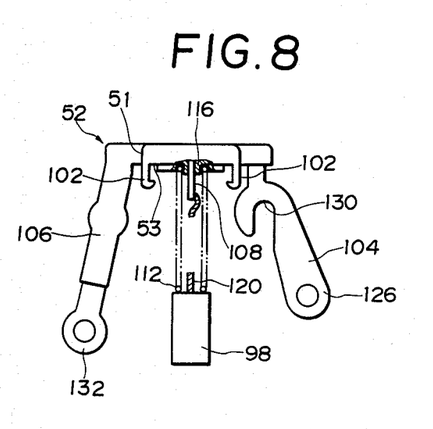
FIG. 8 is a rear view, partly in section, of a lid of the brush holder in FIG. 3.
Figure 9:
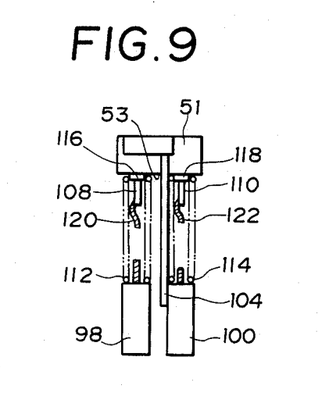
FIG. 9 is a side-elevational view of the lid in FIG. 8.
Figure 10:
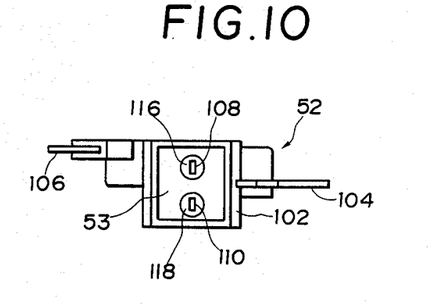
FIG. 10 is a bottom view of the lid in FIG. 8.

Returning to FIG. 4, the lid 52 is detachably attached to the outer end of the guiding portion 54 of the holder body 50 by having its engaging hooks 102 engaged with the engaging projections 58 of the holder body 50, thereby closing the openings 95 and 97 of the hollows 94 and 96 (as shown in FIG. 14) at the outer end face 55 of the brush-guiding portion 54 (see FIG. 7). This lid 52 has first and second terminal strips 104 and 106, parts of which are embedded in the lid 52. The proximal end portions 108 and 110 of the terminal strips 104 and 106 project from the inner face 53 of the lid 52 and are, as illustrated in FIGS. 8 and 9, electrically connected respectively to the brushes 98 and 100 via pigtails 120 and 122. A coil spring 112 is interposed between the brush 98 and the inner face 53 of the lid 52 to urge the brush 98 radially inward against the slip ring 40, and interconnects the brush 98 and the lid 52. Another coil spring 114 is interposed between the brush 100 and the inner face 53 of the lid 52, whereby the brush 100 is urged radially inward against the slip ring 41, and the brush 100 is interconnected to the lid 52. Protrusions 116 and 118 formed on the inner face 53 of the lid 52 are in engagement respectively with the outer ends of the coil springs 112 and 114 to prevent dislocation of the coil springs 112 and 114 (see FIGS. 8, 9 and 10).

Figure 12:
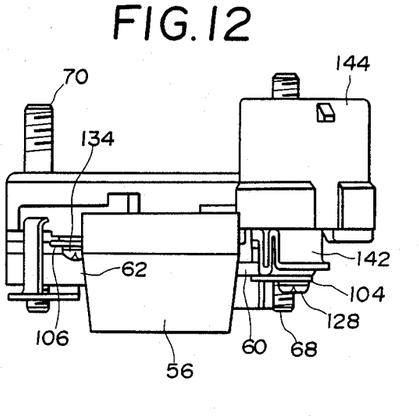
FIG. 12 is a bottom view of the brush holder in FIG. 11.

Returning to FIG. 3, that portion of the first terminal strip 104 outside the brush holder 48 extends from the outer face 51 of the lid 52 toward the positive terminal 140 of the rectifier 84 and is electrically connected at its distal end 126 to a conductive plate 142 by means of a machine screw 128. The conductive plate 142 is a connecting member that electrically connects the positive terminal 124 of the regulator 86 to the positive terminal 140 of the rectifier 84. Also, the first terminal strip 104 has a hooking portion 130 between its proximal and distal end portions 108 (shown in FIGS. 8, 9 and 10) and 126. This hooking portion 130 is engaged with the fastening bolt 68 and is clamped between the first bracket arm 60 and the bracket plate 46. On the other hand, that portion of second terminal strip 106 outside the holder 48 extends from the outer face 51 (as shown in FIGS. 8 and 9) of the lid 52 in such a manner that it intersects bracket arm 62, and is electrically connected at its distal end 132 to the negative terminal 138 of the regulator 86 by means of a machine screw 134. Except for the proximal and distal ends 110 and 132, the second terminal strip 106 is covered by a sheath 136. In addition, as illustrated in FIGS. 3, 11 and 12, the conductive plate 142 also serves as a supporting member which directly contacts with the rear face of a coupler 144 and supports it at its predetermined position. Reference numeral 146 in FIG. 4 designates a packing interposed between the holder body 50 and the lid 52.

In this construction of the generator, it is easy to set and remove the brushes 98 and 100 to and from the brush holder 48 or to check and maintain the brushes since the brushes 98 and 100 are joined to the lid 52 together with the coil springs 112 and 114. For example, the process of setting the brush 98 and 100 is as follows: First, that portion of the rotation shaft 28 where the slip rings 40 and 41 are, is covered by the cylindrical cover portion 56 of the holder body 50; Next, the brushes 98 and 100 together with the coil springs 112 and 114 are inserted into the hollows 94 and 96 of the holder body 50, and at the same time, the lid 52 is attached to the holder body 50. Although brushes of conventional generators must be prevented from projecting out of the brush holders by pins and the like until the brush holders are correctly set in their positions where they cover the slip rings, no such preventing step is necessary in setting the holder 48 of the present invention. Also, no hole for inserting the preventing pin is necessary in the holder 48, certifying in the holder 48, a dependable waterproofing property. The wiring between the regulator 86 and the brushes 98 and 100 can, without error, be easily achieved since it can be completed simultaneously with the attaching of the lid 52 to the holder body 50.

In the operation of this generator, the rotor coil 38 is rotated by the engine of the automobile through the rotation shaft 28, and is simultaneously supplied with a current through the brushes and the slip rings to induce an AC current in the stator coil 44. The induced AC current is then transmitted to the rectifier 84, and is rectified into a DC current. The regulator 86 regulates the outputted DC current in such a manner that when the voltage of the car battery is below a predetermined level, the DC current is supplied to the battery, otherwise the DC current is grounded to the earth through the fastening bolt 70.

Note that, the mating face between the lid 52 and the holder body 50 is not close enough to the slip rings 40 and 41 to cause a problem with the slip rings gaining dirt or rainwater. Also, the holder body 50 can be molded effectively by using a three-way split mold 148, 150 and 152 shown by the phantom line in FIG. 6.

A modified form of the brush holder in FIG. 4 is illustrated in FIG. 14, in which first and second terminal strips 154 and 156 are disposed on a holder body 153. The proximal end 158 of the first terminal strip 154 is electrically connected to the brush 98 via a pigtail 160, while the proximal end 162 of the second terminal strip 156 is electrically connected to the brush 100 via another pigtail 164. The distal end portion 166 of the first terminal strip 154 projects together with the first bracket arm 60, from the guiding portion 54 of the holder body 153, on the other hand, the distal end portion 168 of the second terminal strip 156 projects from the guiding portion 54, in the opposite direction to that of the first terminal strip 154. The coil springs 112 and 114 are interposed between a lid 170 and the brushes 98 and 100 and urges the brushes radially inward against the slip rings 40 and 41. Also in this modified form, the brushes 98 and 100 and the coil springs 112 and 114 can be easily removed from and reset into the brush holder by detaching the lid 170 from the holder body 153.

Although in the proceeding embodiment, the locking section 80 of the fastening bolt 70 has a square cross-section, a locking section having a polygonal or other noncircular cross-section such as one having splines may be employed. Also, in place of the earth terminal 90, other kinds of terminals may be employed to be electrically connected to the fastening bolt 70.

What is claimed is:

1. In an alternating current generator adapted to be used in a vehicle, the generator including: a frame; a rotation shaft supported by the frame for rotation about an axis thereof and having a rotor fixedly fitting around it, the rotor including a rotor coil; a slip ring attached to the rotation shaft and electrically connected to the rotor coil; a brush urged against the slip ring so as to be electrically connected to the slip ring; and a brush holder secured to the frame and retaining the brush in its proper position on the slip ring, the improvement wherein the brush holder comprises:

a cover portion enclosing that portion of the rotation shaft where the slip ring is attached so that the slip ring is protected from outside dust and splash, the cover portion being substantially hollow and generally cylindrical, a brush-guiding portion projecting radially outward from the cover portion and having an outer end face, a hollow slidably receiving substantially the entire brush for movement in a radial direction with respect to the rotation shaft, the hollow having an opening at the outer end face of the brush-guiding portion so that the brush is able to be removed from and inserted into the hollow through the opening, the cover portion being integrally formed with the brush-guiding portion in such a manner that neither a clearance nor a mating surface is produced between the cover portion and the brush-guiding portion, and a lid detachably attached to the brush-guiding portion for opening and closing the opening at the outer end face of the brush-guiding portion, the lid having outer and inner faces, a terminal member projecting from both the outer and inner faces thereof, and the brush being connected to the inner face of the lid through a spring member urging the brush radially inward, the brush being electrically connected to the terminal member.

2. In an alternating current generator adapted to be used in a vehicle, the generator including: a frame; a rotation shaft supported by the frame for rotation about an axis thereof and having a rotor fixedly fitting around it, the rotor including a rotor coil; a slip ring attached to the rotation shaft and electrically connected to the rotor coil; a brush urged against the slip ring; and a brush holder secured to the frame and retaining the brush in its proper position on the slip ring, the improvement wherein the brush holder comprises:

a cover portion enclosing that portion of the rotation shaft where the slip ring is attached so that the slip ring is protected from outside dust and splash, the cover portion being substantially hollow and generally cylindrical, a brush-guiding portion projecting radially outward from the cover portion and having an outer end face, a hollow slidably receiving substantially the entire brush for movement in a radial direction with respect to the rotation shaft, the hollow having an opening at the outer end face of the brush-guiding portion so that the brush is able to be removed from and inserted into the hollow through the opening, the cover portion being integrally formed with the brush-guiding portion in such a manner that neither a clearance nor a mating surface is produced between the cover portion and the brush-guiding portion, and a lid detachably attached to the brush-guiding portion for opening and closing the opening at the outer end face of the brush-guiding portion, the brush-guiding portion of the brush holder having a terminal member projecting into both the inside and the outside of the brush-guiding portion, and the brush being electrically connected to the terminal member.

3. An alternating current generator as recited in claim 1 or 2, wherein the brush holder further comprises a packing member interposed between the brush-guiding portion and the lid so that the opening at the outer end of the brush-guiding portion is hermetically closed.

4. An alternating current generator as recited in claim 1, further comprising: a regulator for having a terminal member; and a bolt member fastening both the regulator and the brush holder to the frame, the bolt member having a serration section and a locking section, the serration section being engaged with the terminal member of the regulator to electrically contact the terminal member of the regulator, the locking section having a non-circular cross-section, and wherein the brush holder has a bracket arm firmly engaged with the locking section of the bolt member so that, when the bolt member is under a torque, most of the torque is transferred from the bolt member to the bracket arm.

5. An alternating current generator as recited in claim 4, wherein the bracket arm of the brush holder has an aperture into which the bolt member is inserted, the aperture having a peripheral wall and a cross section conforming in shape to the locking section cross section of the bolt member, and wherein the locking section of the bolt member is engaged with the peripheral wall of the aperture.

* * * * *